US012803087B2

(12) United States Patent
Kim

(10) Patent No.: US 12,803,087 B2
(45) Date of Patent: Nov. 17, 2026

(54) BATTERY CASE SEALING DEVICE AND BATTERY CASE SEALING METHOD USING THE SAME

(71) Applicant: LG Energy Solution, Ltd., Seoul (KR)

(72) Inventor: Do Jae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 88 days.

(21) Appl. No.: 18/719,332

(22) PCT Filed: Dec. 20, 2022

(86) PCT No.: PCT/KR2022/020883

§ 371 (c)(1),
(2) Date: Jun. 13, 2024

(87) PCT Pub. No.: WO2023/121252

PCT Pub. Date: Jun. 29, 2023

(65) Prior Publication Data

US 2025/0357586 A1 Nov. 20, 2025

(30) Foreign Application Priority Data

Dec. 20, 2021 (KR) ........................ 10-2021-0183210
Dec. 20, 2022 (KR) ........................ 10-2022-0179477

(51) Int. Cl.

*H01M 50/105* (2021.01)
*B29C 65/00* (2006.01)
*H01M 10/04* (2006.01)
*H01M 50/178* (2021.01)

(52) U.S. Cl.

CPC ........... *H01M 50/105* (2021.01); *B29C 65/00* (2013.01); *H01M 10/0404* (2013.01); *H01M 10/049* (2013.01); *H01M 50/178* (2021.01)

(58) Field of Classification Search

CPC ....... B29C 65/00; B29C 65/02; B29C 65/022; B29C 65/04; B29C 65/18; B29C 65/20; B29C 65/24; B29C 65/245; B29C 65/242; B29C 65/30; B29C 65/305; B29C 65/32; B29C 65/38; B29C 65/44; H01M 10/04; H01M 10/0404; H01M 10/049; H01M 50/105; H01M 50/178; H01M 10/0409; Y02E 60/10

See application file for complete search history.

(56) References Cited

U.S. PATENT DOCUMENTS

2014/0090780 A1 4/2014 Jeong
2015/0000117 A1 1/2015 Cho et al.
2017/0025702 A1* 1/2017 Jung ................. H01M 10/0413
2019/0393455 A1 12/2019 Seo et al.
2023/0207857 A1 6/2023 Kim et al.

FOREIGN PATENT DOCUMENTS

| | | | |
|---|---|---|---|
| JP | 2002141102 | A | 5/2002 |
| JP | 2009272161 | A | 11/2009 |
| JP | 2016506049 | A | 2/2016 |
| KR | 20120126932 | A | 11/2012 |
| KR | 20140086907 | A | 7/2014 |
| KR | 20150112377 | A | 10/2015 |
| KR | 20180028714 | A | 3/2018 |
| KR | 20190023649 | A | 3/2019 |
| KR | 20200026064 | A | 3/2020 |
| KR | 20200059392 | A | 5/2020 |
| KR | 20200093956 | A | 8/2020 |
| KR | 102163499 | B1 | 10/2020 |
| KR | 102174607 | B1 | 11/2020 |
| KR | 102287763 | B1 | 8/2021 |
| KR | 20210109793 | A | 9/2021 |
| WO | 2021167130 | A1 | 8/2021 |
| WO | 2021235580 | A1 | 11/2021 |

OTHER PUBLICATIONS

Extended European Search Report including Written Opinion for Application No. 22911885.6 dated Mar. 10, 2025, pp. 1-10.
International Search Report for Application No. PCT/KR2022/020883 mailed Mar. 27, 2023. 3 pages.

* cited by examiner

*Primary Examiner* — Philip C Tucker
*Assistant Examiner* — Jimmy R Smith, Jr.
(74) *Attorney, Agent, or Firm* — Lerner David LLP

(57) ABSTRACT

A battery case sealing device includes: a primary sealing unit that presses and seals a battery case in which an electrode assembly is accommodated; a pair of primary heating units that are disposed in a front and a rear, respectively, of the primary sealing unit and heat the battery case; and a transfer part that transfers the battery case. A battery case sealing method using the same is also included.

13 Claims, 5 Drawing Sheets

BATTERY CASE SEALING DEVICE AND BATTERY CASE SEALING METHOD USING THE SAME

CROSS-REFERENCE TO RELATED APPLICATIONS

The present application is a national phase entry under 35 U.S.C. § 371 of International Application No. PCT/KR2022/020883, filed on Dec. 20, 2022, which claims priority of Korean Patent Application Nos. 10-2021-0183210, filed on Dec. 20, 2021, and 10-2022-0179477, filed on Dec. 20, 2022, all of which are incorporated by reference herein.

TECHNICAL FIELD

The present disclosure relates to a battery case sealing device and a battery case sealing method using the same, and more particularly, to a battery case sealing device, which performs sealing of a pouch type battery case, and a battery case sealing method using the battery case sealing device.

BACKGROUND ART

Batteries (cells) that generate electrical energy through a physical reaction or a chemical reaction of a substance to supply the generated power source to the outside are used when an alternating current power source to be supplied to the building is not obtained, or a direct current power source is required according to the living environments including various electrical and electronic devices.

Among such batteries, primary batteries and secondary batteries, which are chemical batteries using the chemical reaction, are being generally used. The primary batteries are consumable batteries which are collectively referred to as dry batteries. The secondary batteries are rechargeable batteries that are manufactured using a material in which a redox process between a current and a substance is repeatable several times. When a reduction reaction is performed on the material by the current, a power supply is charged, and when an oxidation reaction is performed on the material, the power supply is discharged. Such a charging-discharging is repeatedly performed to generate electricity.

In recent market, attention has been paid to a pouch type secondary battery having a small volume and a high degree of freedom in design. Specifically, a pouch type secondary battery is a secondary battery in which an electrode assembly is accommodated in a pouch type battery case. Here, the battery case generally has a multi-film structure in which an inner resin layer, a metal layer, and an outer resin layer are sequentially stacked from the inside toward the outside.

Such a battery case has a sealing structure in which the inner resin layer is thermally fused and sealed at at least a portion of an outer circumference so that the electrode assembly therein is not exposed to external moisture and air.

As the battery case has an increased thickness for a change in electrode lead thickness and improvement in secondary battery energy density for quick charging of a secondary battery, heat amount and pressure necessary for the sealing of the battery case are required to increase.

However, in a sealing device having one press according to the related art, when a heating temperature of the press is increased, there are problems that a surface of the battery case is melted or wrinkles are caused by heat, and when pressure at which the press presses the battery case is increased, there is a problem that a portion of the inner resin layer flows to the inside or outside of the battery case.

In addition, when the heat amount and pressure conditions of the sealing device are decreased, it is apparent that sealing quality is reduced and, in particular, there are problems that thermal losses occur in an electrode lead having a low rate of temperature rise and the sealing quality of the battery case is markedly reduced at a position corresponding to the electrode lead.

Accordingly, in the sealing device according to the related art, it is very difficult to select the heat amount and pressure conditions for ensuring the sealing quality of the battery case having a large thickness.

DISCLOSURE OF THE INVENTION

Technical Problem

Aspects of the present invention have been devised to solve the problems as above, and one aspect of the present invention is to provide a battery case sealing device, which is capable of securing sealing quality even when sealing is performed on a battery case having a large thickness, and a battery case sealing method using the battery case sealing device.

Technical Solution

An aspect of the present invention provides a battery case sealing device including: a primary sealing unit that presses and seals a battery case in which an electrode assembly is accommodated; a pair of primary heating units that are disposed in front and rear, respectively, of the primary sealing unit and heat the battery case; and a transfer part that transfers the battery case.

The primary heating units may extend in a transfer direction of the battery case.

The primary heating units may heat the battery case in a non-contact manner.

The battery case may have at least one end from which an electrode lead electrically connected to the electrode assembly protrudes, and the primary sealing unit may press and seal an area that corresponds to the electrode lead in the battery case.

Meanwhile, the battery case sealing device according to an aspect of the present invention may further include a secondary sealing unit that is disposed behind the primary sealing unit and the primary heating units, so as to press and seal the battery case.

In addition, the battery case sealing device according to an aspect of the present invention may further include a secondary heating unit that is disposed behind the secondary sealing unit and heats the battery case.

Moreover, the battery case sealing device according to an aspect of the present invention may further include a transfer part that transfers the battery case, and the secondary heating unit may extend in the transfer direction of the battery case.

The secondary heating unit may heat the battery case in a non-contact manner.

A pressing area on which the secondary sealing unit presses the battery case may be larger than a pressing area on which the primary sealing unit presses the battery case.

Meanwhile, an aspect of the present invention provides a battery case sealing method including: a first heating process of heating a battery case in which an electrode assembly is accommodated; a first sealing process of pressing and sealing the battery case after the first heating process; and a second heating process of heating the battery case after the first sealing process.

In at least one of the first heating process or the second heating process, the battery case may be heated in a transfer direction of the battery case.

In at least one of the first heating process or the second heating process, the battery case may be heated in a non-contact manner.

In the first sealing process, the sealing may be performed at a position corresponding to an electrode lead protruding from at least one end of the electrode assembly.

Meanwhile, the battery case sealing method according to an aspect of the present invention may further include a second sealing process of pressing and sealing the battery case after the first sealing process and the second heating process.

In addition, the battery case sealing method according to an aspect of the present invention may further include a post-heating process of heating the battery case after the second sealing process.

Advantageous Effects

According to the preferred embodiments of the present invention, the pair of primary heating units may be provided in front and rear, respectively, of the primary sealing unit and thus, there are the advantages that the sufficient heat amount necessary for the battery case sealing may be secured, the rapid changes in temperature of the battery case may be prevented, and the thermal losses during the transfer of the battery case may be prevented to reduce the damage to the battery case outer appearance and improve the sealing quality of the battery case.

In addition, the secondary sealing unit and the primary sealing unit may be included to press and seal the sealing area of the battery case multiple times and thus, there is the advantage that the sealing quality may be secured even when the thickness of the battery case increases.

Moreover, the primary sealing unit, the secondary sealing unit, the primary heating unit, and the secondary heating unit may be used to variously select the heat amount and pressure conditions for the sealing of the battery case and thus, there is the advantage that it is possible to quickly and easily correspond to the sealing of the battery case having the large thickness as well.

DETAILED DESCRIPTION

Figure 1:
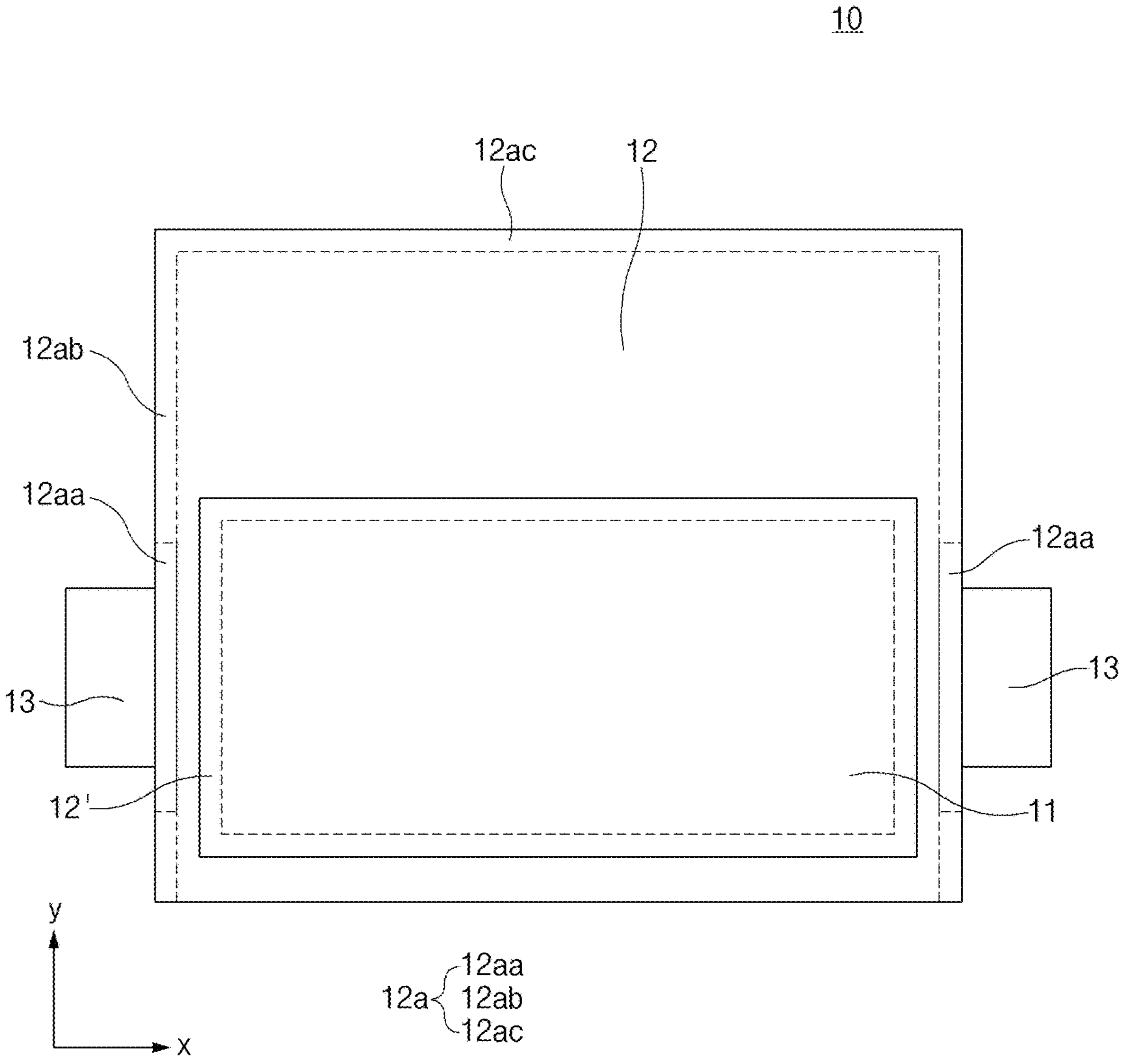
FIG. 1 is a front view of a secondary battery.

Hereinafter, preferred embodiments of the present invention will be described in detail with reference to the accompanying drawings to enable those skilled in the art to which the present invention pertains to easily carry out the present invention. The present invention may, however, be embodied in different forms and should not be construed as limited by the embodiments set forth herein.

The parts unrelated to the description, or the detailed descriptions of related well-known art that may unnecessarily obscure subject matters of the present invention, will be excluded in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Battery Case Sealing Device (100)

Some embodiments of the present invention provide a battery case sealing device 100 including a primary sealing unit 110, which presses and seals a battery case 12 in which an electrode assembly 11 is accommodated, a pair of primary heating units 120, which are disposed in front and rear, respectively, of the primary sealing unit 110 and heat the battery case 12, and a transfer part 130 that transfers the battery case 12.

First, the battery case 12, which is sealed by the battery case sealing device 100 and constitutes a secondary battery 10 together with the electrode assembly 11, is described before a configuration of the battery case sealing device 100 is described.

The battery case 12 is a component in which the electrode assembly 11 is accommodated, as illustrated in FIG. 1, and may have various configurations. Here, the electrode assembly 11 is a component that is accommodated in the battery case 12, and it is noted that the electrode assembly 11 is indicated by dotted lines.

Here, the electrode assembly 11 is a component, in which an electrode active material is applied onto an electrode collector to configure each of a positive electrode and a negative electrode and a separator is interposed between the positive electrode and the negative electrode, and may have a wound type structure, a stacked type structure, a stack and folding type structure, or the like. This electrode assembly 11 may be accommodated together with an electrolyte in the battery case 12.

Specifically, the battery case 12 may be provided with an accommodation part 12', in which the electrode assembly 11 is accommodated, and have at least one end from which an electrode lead 13 electrically connected to the electrode assembly 11 protrudes. Here, the accommodation part 12' may be understood as an area that is concavely formed in at least one area of the battery case 12 so that the electrode assembly 11 is accommodatable therein.

More specifically, in a state in which the battery case 12 in which the electrode assembly 11 is accommodated is unfolded before folding as illustrated in FIG. 2*a*, the battery case 12 may be folded in half in a longitudinal direction (y direction in FIG. 2*b*) of the battery case 12 as illustrated in FIG. 2*b*, thereby manufacturing the battery case 12.

Such a battery case 12 may have a sealing structure in order to prevent the electrode assembly 11, which is accommodated in the accommodation part 12', from being damaged by exposure to external moisture, air, and the like.

Specifically, the battery case 12 may include a sealing area 12*a* formed by attaching some areas of an outer circumference of the battery case 12 to each other. Here, when the battery case 12 is folded or at least two battery cases 12 are provided to overlap each other and form areas in which the battery cases 12 are in contact with each other, the outer circumference is heated and/or pressed to attach the areas to each other in an area, and this area may be understood as the sealing area 12*a*.

More specifically, the sealing area 12*a* may include a first sealing area 12*aa*, which corresponds to the electrode lead 13, of the sealing area 12*a* formed in the width direction (y direction in FIG. 1) of the battery case 12, a second sealing area 12*ab*, which is a remaining area except for the first sealing area 12*aa*, of the sealing area 12*a* formed in the width direction (y direction in FIG. 1) of the battery case 12, and a third sealing area 12*ac* which is formed in a longitudinal direction (x direction in FIG. 1) of the battery case 12.

Here, the first sealing area 12*aa* is an area in which the electrode lead 13 is in contact with the battery case 12, and may be understood as an area in which sealing between the electrode lead 13 and the battery case 12 is performed.

The sealing area 12*a* may be formed by performing sealing on the first sealing area 12*aa* and the second sealing area 12*ab* as illustrated in FIG. 2*c*, and then performing sealing on the third sealing area 12*ac* as illustrated in FIG. 2*d*. Here, the electrolyte may be introduced into the accommodation part 12' after the sealing is performed on the first sealing area 12*aa* and the second sealing area 12*ab* and before the sealing is performed on the third sealing area 12*ac*.

Figure 3:
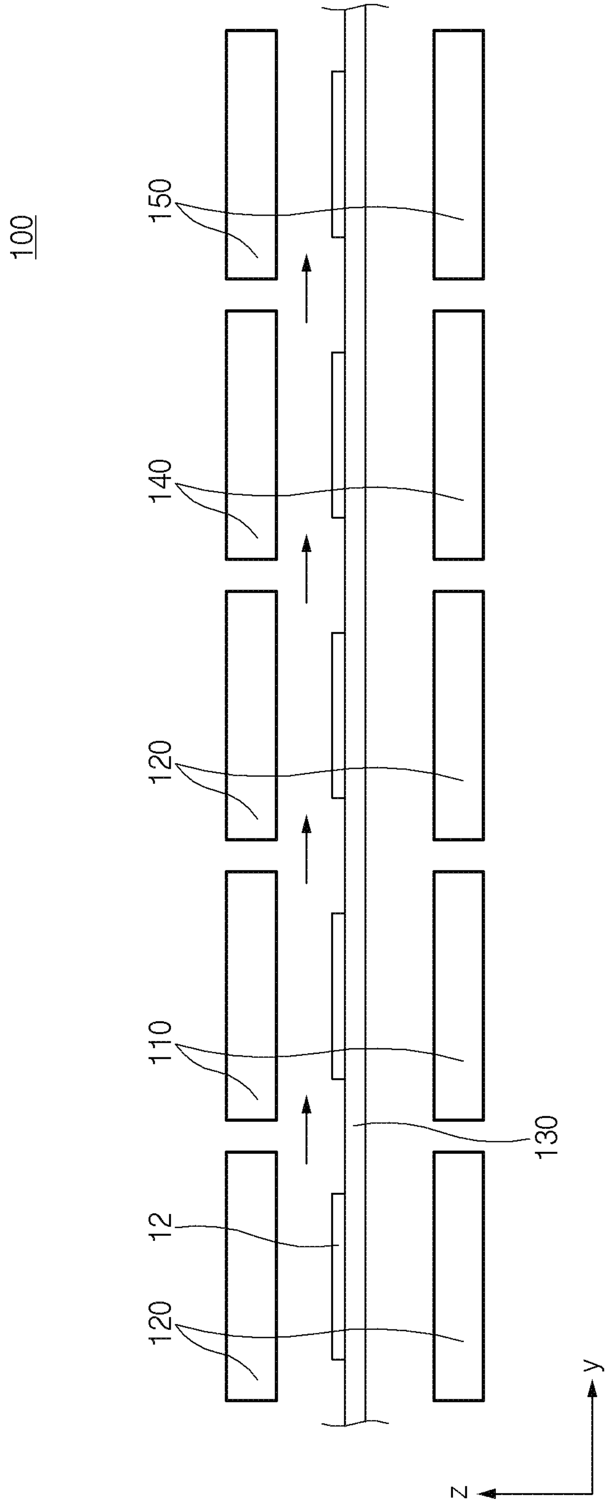
FIG. 3 is a schematic conceptual view illustrating a configuration of a battery case sealing device according to Embodiment 1 of the present invention.

Meanwhile, the battery case 12 may be transferred by the transfer part 130. Specifically, the battery case 12 may be transferred with the electrode assembly 11 accommodated therein by the transfer part 130. The transfer part 130 may be constituted by a conveyor belt, a plurality of rollers, or the like. Here, as illustrated in FIG. 3, the battery case 12 may be transferred so as to pass the primary sealing unit 110, the primary heating units 120, a secondary sealing unit 140, and a secondary heating unit 150, which are be described below.

Here, the primary sealing unit 110 is a component, which presses and seals the battery case 12, and may have various configurations. The primary sealing unit 110 may press and seal an area that corresponds to the electrode lead in the battery case.

Specifically, the primary sealing unit 110 may be disposed at at least one of an upper side or a lower side of the battery case 12 transferred by the transfer part 130, and press at least a portion of the outer circumference of the battery case 12, thereby sealing the sealing area 12*a*. To this end, the primary sealing unit 110 may be provided to be vertically movable toward the battery case 12. Here, the primary sealing unit 110 may also perform the sealing of the sealing area 12*a* by pressing and heating the at least a portion of the outer circumference of the battery case 12 at the same time.

In more detail, the primary sealing unit 110 may press and seal at least one of the first sealing area 12*aa*, the second sealing area 12*ab*, or the third sealing area 12*ac*. That is, when each of the sealing areas is formed to be stepped, the primary sealing unit 110 may include a shape that is stepped so as to correspond to the shape of each of the sealing areas.

Here, when the secondary sealing unit 140 to be described later is additionally provided in some embodiments of the present invention, the primary sealing unit 110 may perform the sealing limitedly on the first sealing area 12*aa* that is disposed to correspond to the electrode lead 13 in the battery case 12.

That is, the primary sealing unit 110 may perform the sealing limitedly on the first sealing area 12*aa*, considering that a seal stepped portion may occur when the sealing is performed on the same area multiple times, and since losses of a heat amount necessary for the sealing occur in the electrode lead 13 having a lower rate of temperature rise than the battery case 12, the sealing quality is reduced at a position corresponding to the electrode lead 13.

Meanwhile, the pair of primary heating units 120 may be provided in front and rear, respectively, of the primary sealing unit 110. Hereinafter, for convenience of explanation, a transfer direction is the direction in which the battery case 12 is transferred, the side corresponding to the origin of the transfer direction on the transfer part 130 is referred to as a rear side, and a direction opposite to the rear side is referred to a front side.

Figure 2:
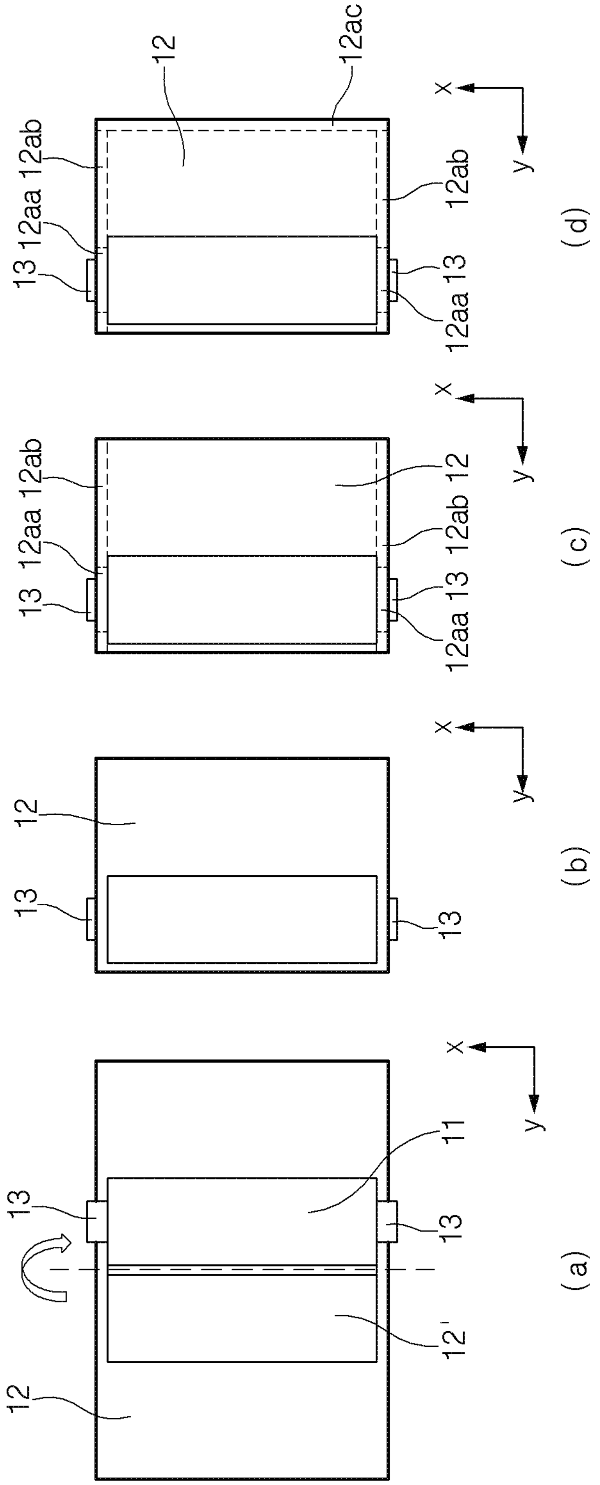
FIGS. 2*a* to 2*d* are schematic views sequentially illustrating states in which the secondary battery in FIG. 1 is manufactured.

Specifically, the primary heating units 120 are components, which are disposed in the front and the rear, respectively, of the primary sealing unit 110 and are configured to heat the battery case 12 as illustrated in FIG. 2, and may have various configurations.

For example, each of the primary heating units 120 may extend in a transfer direction of the battery case 12 in order to minimize the thermal losses of the battery case 12, which may be caused by the battery case 12 transfer.

Specifically, the primary heating unit 120 may extend in the transfer direction of the battery case 12 so as to supply heat to the battery case 12 continuously. To this end, the primary heating unit 120 may include a plurality of heating blocks (not shown) that are arranged in the transfer direction of the battery case 12. Accordingly, the primary heating unit 120 may minimize the thermal losses that may occur in the battery case 12 during the transfer of the battery case 12.

In addition, the primary heating unit 120 may heat the battery case 12 in a non-contact manner.

Specifically, the primary heating unit 120 may include a non-contact type heating means such as high-frequency heating means, infrared heating means, or ultraviolet heating means, and may be spaced a predetermined distance from the battery case 12 and heat the battery case 12 in the non-contact manner. Accordingly, the primary heating unit 120 may heat the battery case 12 simultaneously with the transfer of the battery case 12 so as to minimize the thermal losses of the battery case 12 and perform the process continuously.

The primary heating unit 120 may form the high temperature atmosphere near the battery case 12 continuously before the sealing is performed on the battery case 12 by the primary sealing unit 110 and after the sealing is performed on the battery case 12, thereby securing the sealing quality sufficiently without applying excessive pressure.

Here, the high temperature may be understood as a temperature higher than the room temperature. Here, the room temperature means a range of temperatures, which is called a constant temperature in the relevant field. The room temperature generally refers to a temperature at which humans are comfortable, and may be understood to be typically about 15° C. to about 20° C. Accordingly, the temperature higher than the room temperature may be a temperature of 20° C. or higher, and more specifically, when a material of the inner resin layer of the sealing area 12*a* is a polypropylene resin, the temperature higher than the room temperature may be understood to be 160° C. to 190° C.

Specifically, the primary heating unit 120 of the pair of primary heating units 120, which is disposed in front of the primary sealing unit 110, may enable the battery case 12 to secure the heat amount necessary for the sealing in advance before the sealing is performed on the battery case 12. This allows the inner resin layer of the sealing area 12*a* to be sufficiently melted even when the battery case 12 having a large thickness is sealed, and thus, may help to improve the sealing quality. In other words, when the sealing process is performed in high-temperature and high-pressure environments after the heating by the primary sealing unit 110, there is a problem that the inner resin layer that has not been melted is pressed and is not precisely sealed. Such a problem may be prevented by preheating by the primary heating unit 120 disposed in front of the primary sealing unit 110.

Here, the thickness of the battery case 12 may be understood to be 180 μm to 190 μm. However, it is noted that the thickness of the battery case 12 is not limited thereto.

In addition, the primary heating unit 120 of the pair of primary heating units 120, which is disposed in the rear side of the primary sealing unit 110, may prevent rapid changes in temperature of the battery case 12 after the sealing is performed on the battery case 12 and minimize generation of bubbles in the inner resin layer. Specifically, when the temperature of the battery case 12 changes rapidly after the sealing process, the resin layer is rapidly solidified in a state in which the air present in the resin layer has not been discharged, and thus, the problem that the bubbles are formed in the resin layer may occur. That is, the primary heating unit 120 disposed in the rear side of the primary sealing unit 110 may maintain the high-temperature environments so that the air in the resin layer is gradually discharged. Accordingly, the generation of bubbles in the inner resin layer may be minimized.

Moreover, when the secondary sealing unit 140 is additionally provided in some embodiments of the present invention and the sealing is performed multiple times, the primary heating unit 120 may allow the inner resin layer of the sealing area 12*a* to be melted sufficiently before sealing is performed by the secondary sealing unit 140. Thus, the primary heating unit 120 may also help to improve the sealing quality.

Meanwhile, the battery case 12 sealing device according to some embodiments of the present invention may further include the secondary sealing unit 140 that is disposed in the rear side of the primary sealing unit 110 and the primary heating units 120 and presses and seals the battery case 12.

Specifically, the secondary sealing unit 140 is a component, which presses and seals at least a portion of the outer circumference of the battery case 12, and may have various configurations.

Specifically, the secondary sealing unit 140 may be disposed at at least one of the upper side or the lower side of the battery case 12 transferred by the transfer part 130, and press and seal the at least a portion of the outer circumference of the battery case 12. To this end, the secondary sealing unit 140 may be provided to be vertically movable toward the battery case 12. Here, the secondary sealing unit 140 may also perform the sealing on the sealing area 12*a* by pressing and heating the at least a portion of the outer circumference of the battery case 12 at the same time.

Meanwhile, the secondary sealing unit 140 may seal at least one of the first sealing area 12*aa*, the second sealing area 12*ab*, or the third sealing area 12*ac* described above.

Here, a pressing area on which the secondary sealing unit 140 presses the battery case 12 may be larger than a pressing area on which the primary sealing unit 110 presses the battery case 12.

Specifically, the secondary sealing unit 140 may press and seal a larger area than the primary sealing unit 110, considering that an area that is not sealed by the primary sealing unit 110 needs to be sealed to form a sealing structure of the battery case 12, and even an area sealed by the primary sealing unit 110 may be additionally sealed in order to supplement the sealing quality.

For example, when the primary sealing unit 110 presses and seals the first sealing area 12*aa*, the secondary sealing unit 140 may press and seal at least one of the second sealing area 12*ab* or the third sealing area 12*ac* together with the first sealing area 12*aa*.

Meanwhile, some embodiments of the present invention may further include the secondary heating unit 150 that is disposed in the rear side of the secondary sealing unit 140 and heats the battery case 12.

Specifically, the secondary heating unit 150 is a component, which heats the battery case 12, and may have various configurations.

For example, the secondary heating unit 150 may extend in the transfer direction of the battery case 12 in order to minimize the thermal losses of the battery case 12, which may be caused by the battery case 12 transfer.

Specifically, the secondary heating unit 150 may extend in the transfer direction of the battery case 12 so as to supply heat to the battery case 12 continuously. To this end, the secondary heating unit 150 may include a plurality of heating blocks (not shown) that are arranged in the transfer direction of the battery case 12. Accordingly, the secondary heating unit 150 may minimize the thermal losses that may occur in the battery case 12 during the transfer of the battery case 12.

In addition, the secondary heating unit 150 may heat the battery case 12 in a non-contact manner.

Specifically, the secondary heating unit 150 may be spaced a predetermined distance from the battery case 12 and heat the battery case 12 in the non-contact manner through a non-contact type heating means such as high-frequency heating means, infrared heating means, or ultraviolet heating means. Accordingly, the secondary heating unit 150 may heat the battery case 12 simultaneously with the transfer of the battery case 12 and thus, may minimize the thermal losses of the battery case 12 and may perform the process continuously.

The secondary heating unit 150 may prevent rapid changes in temperature of the battery case 12 after the sealing is performed on the battery case 12, and minimize generation of bubbles in the inner resin layer.

Meanwhile, the primary sealing unit 110 may have various structures.

Hereinafter, the structure of the primary sealing unit 110 is described more specifically with reference to FIG. 4. The structure of the primary sealing unit 110 may apply also to the secondary sealing unit 140, and it is noted that hereinafter, only the structure of the primary sealing unit 110 is described for convenience of explanation.

Figure 4:
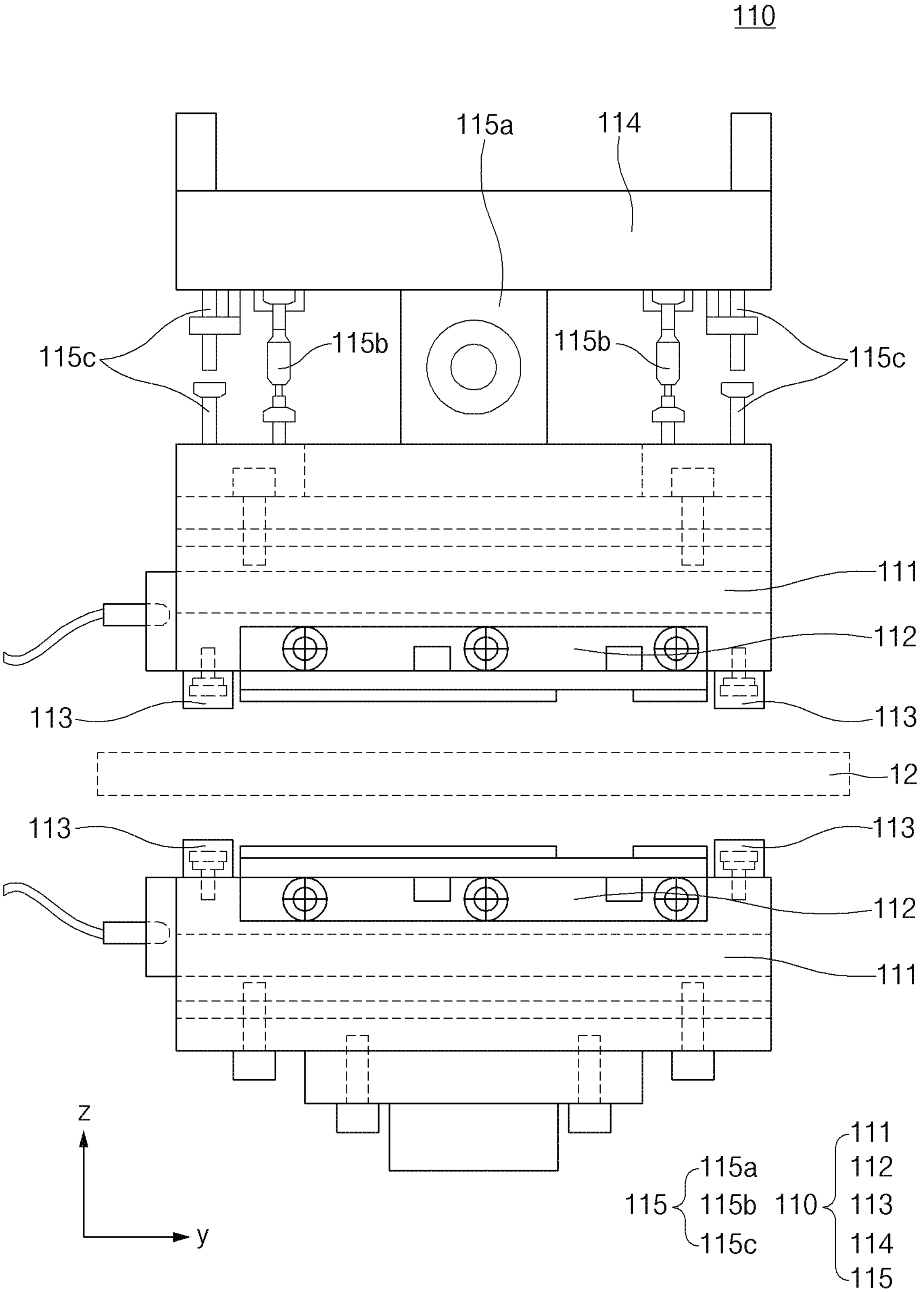
FIG. 4 is a side view more specifically illustrating a configuration of a primary sealing unit in the battery case sealing device in FIG. 2.

For example, as illustrated in FIG. 4, the primary sealing unit 110 may include a body part 111, and a press part 112 that is coupled to the body part 111 and presses the battery case 12.

Here, the body part 111 may have a structure in which multiples blocks are stacked and bolt-coupled to each other. Here, at least one of the blocks may be connected to an external electrical device and generate the temperature higher than the room temperature. Here, the meaning of the room temperature may be cited from the foregoing contents.

The press part 112 is a component, which presses the battery case 12, and may have various configurations.

For example, the press part 112 may protrude from one surface of the body part 111 toward the battery case 12 and perform the pressing of the sealing area 12*a* described above. Here, the sealing area 12*a* may include at least one of the first sealing area 12*aa*, the second sealing area 12*ab*, or the third sealing area 12*ac*. This press part 112 may have various shapes. Here, the press part 112 may be changed to correspond to the shape of the sealing area 12*a*.

Meanwhile, a pair of thickness adjusting stoppers 113 may be provided at both sides, respectively, of the press part 112.

Specifically, the thickness adjusting stoppers 113 are components for adjusting a thickness of the sealing area 12*a* pressed by the press part 112, and may be provided at the both sides, respectively, of the press part 112 and protrude from the body part 111 toward the battery case 12.

Here, a protrusion height to which each of the thickness adjusting stoppers 113 protrudes from the body part 111 may be variously set, but preferably, the protrusion height of the thickness adjusting stopper 113 may be set to be longer than a protrusion height of the press part 112. Here, the protrusion height of the thickness adjusting stopper 113 may be understood as a height from one surface of the body part 111 to one surface of the thickness adjusting stopper 113, which is disposed in a direction opposite to the body part 111 and in contact with the battery case 12. The protrusion height of the press part 112 may be understood as a height from the one surface of the body part 111 to one surface of the press part 112, which is disposed in the direction opposite to the body part 111 and in contact with the battery case 12.

Meanwhile, as illustrated in FIG. 4, the primary sealing unit 110 may be disposed at each of the upper side and the lower side of the battery case 12. Here, the primary sealing unit 110, which is disposed at the upper side of the battery case 12, may further include a tilt adjusting part 115 that adjusts a tilt of each of the body part 111 and the press part 112 so that the thickness of the sealing area 12*a* of the battery case 12 is uniform.

Specifically, the primary sealing unit 110 may further include an elevating part 114, which is connected to an external elevating device (not shown) and ascends and descends, and the tilt adjusting part 115 which is provided between the elevating part 114 and the body part 111 and adjusts the tilt of each of the body part 111 and the press part 112.

More specifically, the tilt adjusting part 115 may include a connecting part 115*a*, which connects the elevating part 114 and the body part 111 to each other, and a pair of deformation parts 115*b*, each of which has both ends connected to the elevating part 114 and the body part 111, respectively, and is deformed to be contracted.

That is, when one of the pair of deformation parts 115*b* contracts, the other may stretch to adjust the tilt of each of the body part 111 and the press part 112. Here, the connecting part 115*a* may be provided to be rotatable.

Meanwhile, the tilt adjusting part 115 may further include a pair of tilt stoppers 115*c* that restrict a tilt degree of each of the body part 111 and the press part 112. Here, the tilt stoppers 115*c* may protrude from the elevating part 114 and the body part 111, respectively, so as to face each other, and may be provided so as to be spaced apart from each other. Accordingly, when each of the body part 111 and the press part 112 is inclined at a preset angle or greater, the tilt stoppers 115*c* may mechanically restrict the tilt of each of the body part 111 and the press part 112.

Battery Case Sealing Method

Figure 5:
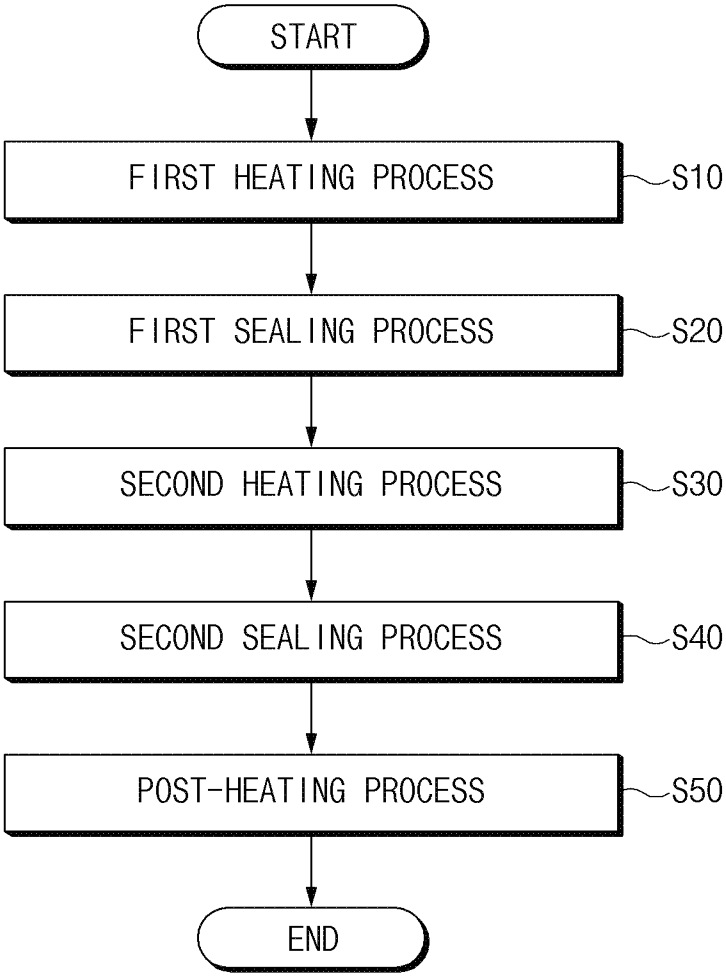
FIG. 5 is a flowchart sequentially illustrating a battery case sealing method according to Embodiment 2 of the present invention.

Meanwhile, as illustrated in FIG. 5, some embodiments of the present invention provide a battery case 12 sealing method including a first heating process of heating a battery case 12 in which an electrode assembly 11 is accommodated (S10), a first sealing process of pressing and sealing the battery case 12 after the first heating process (S10) (S20), and a second heating process of heating the battery case 12 after the first sealing process (S20) (S30). Here, each of the processes may be carried out simultaneously with transfer of the battery case 12.

Here, the first heating process (S10) is a process of heating the battery case 12 in which the electrode assembly 11 is accommodated, and may be performed through various methods.

Specifically, the first heating process (S10) may be performed by heating the battery case 12 by using a primary heating unit 120, which is disposed in front of a primary sealing unit 110, before the first sealing process (S20). Accordingly, there is an advantage that the battery case 12 may secure a heat amount necessary for the sealing in advance through the first heating process (S10) before the sealing process is performed. Here, specific contents of the primary heating unit 120 may be cited from the foregoing contents.

In this first heating process (S10), the battery case 12 may be heated in a transfer direction of the battery case 12. Accordingly, the first heating process (S10) may minimize thermal losses that may occur during the transfer of the battery case 12.

In addition, the battery case 12 may be heated in a non-contact manner in the first heating process (S10). Specifically, the first heating process (S10) may be performed by heating the battery case 12 in a non-contact manner using high frequency, infrared, ultraviolet, or the like.

Meanwhile, the first sealing process (S20) of sealing the battery case 12 may be performed after the first heating process (S10).

Specifically, the first sealing process (S20) is a process of pressing and sealing the battery case 12 after the first heating process (S10), and may be performed in various methods. Here, the first sealing process (S20) may be performed by the foregoing primary sealing unit 110, and specific contents of the primary sealing unit 110 may be cited from the foregoing contents.

Here, at least one of a first sealing area 12*aa*, a second sealing area 12*ab*, or a third sealing area 12*ac* may be pressed and sealed in the first sealing process (S20).

Here, when a second sealing process (S40) to be described later is additionally provided in some embodiments of the present invention, the sealing may be performed limitedly on the first sealing area 12*aa*, which is disposed to correspond to the electrode lead 13, in the first sealing process (S20).

That is, the sealing may be performed limitedly on the first sealing area 12*aa* in the first sealing process (S20), considering that a seal stepped portion may occur when the sealing is performed on the same area multiple times, and since losses of a heat amount necessary for the sealing occur in the electrode lead 13 having a lower rate of temperature rise than the battery case 12, the sealing quality is reduced at a position corresponding to the electrode lead 13.

Meanwhile, the second heating process (S30) of heating the battery case 12 may be performed after the first sealing process (S20).

Specifically, the second heating process (S30) is a process of heating the battery case 12 after the first sealing process (S20), and may be performed in various methods.

Specifically, the second heating process (S30) may be performed by heating the battery case 12 by using a primary heating unit 120, which is disposed in the rear side of the primary sealing unit 110, after first sealing process (S20). Here, specific contents of the primary heating unit 120 may be cited from the foregoing contents.

Accordingly, the second heating process (S30) may enable an inner resin layer of a sealing area 12*a* to be sufficiently melted after the sealing is performed, and minimize generation of bubbles due to rapid changes in temperature.

In addition, when the second sealing process (S40) to be described later is additionally provided in some embodiments of the present invention and the sealing is performed multiple times, the inner resin layer of the sealing area 12*a* may be sufficiently melted through the second heating process (S30) before the sealing is performed through the second sealing process (S40). Thus, the second heating process (S30) may also help to improve the sealing quality.

In this second heating process (S30), the battery case 12 may be heated in the transfer direction of the battery case 12. Accordingly, the thermal losses that may occur during the transfer of the battery case 12 may be minimized in the second heating process (S30).

In addition, the battery case 12 may be heated in a non-contact manner in the second heating process (S30). Specifically, the second heating process (S30) may be performed by heating the battery case 12 in a non-contact manner using high frequency, infrared, ultraviolet, or the like.

Meanwhile, the battery case 12 sealing method according to some embodiments of the present invention may further include the second sealing process (S40) of sealing the battery case 12 after the first sealing process (S20) and the second heating process (S30).

Specifically, the second sealing process (S40) is a process of pressing and sealing the battery case 12 after the first sealing process (S20) and the second heating process (S30), and may be performed in various methods.

Here, the second sealing process (S40) may supplement the sealing of the battery case 12 by pressing and sealing an area, which is not pressed in the first sealing process (S20) described above, by using the foregoing secondary sealing unit 140 described above, or by additionally pressing an area that is pressed and sealed in the first sealing process (S20). Here, specific contents of the secondary sealing unit 140 may be cited from the foregoing contents.

Specifically, at least one of the first sealing area 12*aa*, the second sealing area 12*ab*, or the third sealing area 12*ac* may be sealed in the second sealing process (S40).

Here, a pressing area on which the battery case 12 is pressed in the second sealing process (S40) may be larger than a pressing area on which the battery case 12 is pressed in the first sealing process (S20) described above.

Specifically, an area to be sealed in the second sealing process (S40) may be larger than an area to be sealed in the first sealing process (S20), considering that an area that is not sealed in the first sealing process (S20) described above needs to be sealed to form a sealing structure of the battery case 12, and even the area sealed in the first sealing process (S20) described above may be additionally sealed in order to supplement the sealing quality.

For example, when only the first sealing area 12*aa* is pressed and sealed in the first sealing process (S20), at least one of the second sealing area 12*ab* or the third sealing area 12*ac* may be sealed together with the first sealing area 12*aa* in the second sealing process (S40). That is, when only the first sealing area 12*aa* is sealed in the first sealing process (S20), the first sealing area 12*aa* and the second sealing area 12*ab* may be sealed in the second sealing process (S40).

Meanwhile, the battery case sealing method according to some embodiments of the present invention may further include a post-heating process (S50) of heating the battery case 12 after the second sealing process (S40).

Specifically, the post-heating process (S50) is a process of heating the battery case 12 after the second sealing process (S40), and may be performed in various methods.

Specifically, the post-heating process (S50) may be performed by heating the battery case 12 by using a secondary heating unit 150, which is disposed in the rear side of the secondary sealing unit 140, after the second sealing process (S40). Accordingly, in the post-heating process (S50), the inner resin layer of the sealing area 12*a* may be sufficiently melted and generation of bubbles according to rapid changes in temperature may be minimized. Here, specific contents of the secondary heating unit 150 may be cited from the foregoing contents.

In this post-heating process (S50), the battery case 12 may be heated in the transfer direction of the battery case 12. Accordingly, the thermal losses that may occur during the transfer of the battery case 12 may be minimized in the post-heating process (S50).

In addition, the battery case 12 may be heated in a non-contact manner in the post-heating process (S50). Specifically, the post-heating process (S50) may be performed by heating the battery case 12 in a non-contact manner using high frequency, infrared, ultraviolet, or the like.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

DESCRIPTION OF THE SYMBOLS

10: Secondary battery
11: Electrode assembly
12: Battery case
12' Accommodation part
12*a*: Sealing area
12*aa*: First sealing area
12*ab*: Second sealing area
12*ac*: Third sealing area
13: Electrode lead
100: Battery case sealing device
110: Primary sealing unit
111: Body part
112: Press part
113: Thickness adjusting stopper
114: Elevating part
115: Tilt adjusting part
115*a*: Connecting part
115*b*: Deformation part
115*c*: Tilt stopper
120: Primary heating unit
130: transfer part
140: Secondary sealing unit
150: Secondary heating unit
S10: First heating process
S20: First heating process
S30: Second heating process
S40: Second sealing process
S50: Post-heating process

The invention claimed is:

1. A battery case sealing device comprising:

a primary sealing unit configured to press and seal a battery case in which an electrode assembly is accommodated;

a pair of primary heating units disposed in a front and a rear, respectively, of the primary sealing unit, wherein the pair of heating units are configured to heat the battery case;

a transfer part configured to transfer the battery case in a transfer direction along a transfer path; and a secondary sealing unit disposed after the primary sealing unit and the primary heating units in the transfer direction along the transfer path;

wherein the secondary sealing unit is configured to press and seal the battery case, and wherein a pressing area, on which the secondary sealing unit is configured to press the battery case, is larger than a pressing area on which the primary sealing unit is configured to press the battery case.

2. The battery case sealing device of claim 1, wherein the pair of primary heating units are disposed along the transfer path in the transfer direction, wherein one of the pair of primary heating units is disposed before the primary sealing unit in the transfer direction along the transfer path, and the other of the pair of primary heating units is disposed after the primary sealing unit in the transfer direction along the transfer path.

3. The battery case sealing device of claim 1, wherein the pair of primary heating units are configured to heat the battery case in a non-contact manner.

4. The battery case sealing device of claim 1, wherein the battery case has an electrode lead electrically connected to the electrode assembly, wherein the electrode lead protrudes from at least one end of the battery case, and wherein the primary sealing unit is configured to press and seal an area of the battery case that conforms to the electrode lead.

5. The battery case sealing device of claim 1, further comprising a secondary heating unit disposed after the secondary sealing unit in the transfer direction along the transfer path;

wherein the secondary heating unit is configured to heat the battery case.

6. The battery case sealing device of claim 5, wherein the secondary heating unit extends along the transfer direction.

7. The battery case sealing device of claim 5, wherein the secondary heating unit is configured to heat the battery case in a non-contact manner.

8. A battery case sealing method using the device of claim 1, comprising:

heating the battery case in which the electrode assembly is accommodated in a first heating process;

pressing and sealing the battery case after the first heating process in a first sealing process; and heating the battery case after the first sealing process in a second heating process.

9. The battery case sealing method of claim 8, wherein, in at least one of the first heating process and the second heating process, the battery case is heated while the battery case is transferred along the transfer path in the transfer direction.

10. The battery case sealing method of claim 8, wherein, in at least one of the first heating process and the second heating process, the battery case is heated in a non-contact manner.

11. The battery case sealing method of claim 8, wherein, in the first sealing process, the sealing is performed at a position corresponding to an electrode lead protruding from an at least one end of the electrode assembly.

12. The battery case sealing method of claim 8, further comprising pressing and sealing the battery case after the first sealing process and the second heating process in a second sealing process.

13. The battery case sealing method of claim 12, further comprising heating the battery case after the second sealing process in a post-heating process.

* * * * *